United States Patent Office 3,389,516
Patented June 25, 1968

3,389,516
PRESTRESSED CONCRETE PRESSURE VESSEL
FOR NUCLEAR REACTORS
Albert Ziegler, Erlangen, Germany, assignor to Siemens Aktiengesellschaft, Munich, Germany, a corporation of Germany
Filed Mar. 4, 1965, Ser. No. 437,321
Claims priority, application Germany, Mar. 6, 1964, S 89,874
2 Claims. (Cl. 52—224)

ABSTRACT OF THE DISCLOSURE

Prestressed concrete pressure vessel for nuclear reactors and the like has a cylindrical wall open at both ends thereof formed by an assembly of prefabricated concrete segments spaced circumferentially one from the other so as to define a plurality of gaps therebetween filled with pressure-resistant material, and annular prestressing means for prestressing the concrete segments. The cylindrical wall has a cylindrical outer surface on which the annular prestressing means are disposed and a cylindrical inner surface located intermediate to respective regions adjacent the open ends of the cylindrical wall, the prefabricated concrete segments at those regions being formed with bracing surfaces. Also provided are wedge-shaped support members having surfaces engageable with the bracing surfaces and extending radially inwardly of the cylindrical wall, the support members being also formed with bearing contact surfaces, and end blocks are inserted in the open ends and are provided with conical surfaces engageable with the bearing contact surfaces for closing the open ends of the cylindrical wall. The bracing surfaces are in substantially stepwise arrangement and are at least partly parallel to the conical surfaces of the end blocks. At least one of the wedge-shaped support members may consist of two side portions and a middle portion, the middle portion lying substantially in a plane passing through the longitudinal axis of the cylindrical wall and having parallel side surfaces respectively adjacent the side portions.

My invention relates to prestressed concrete pressure vessels for nuclear reactors.

In my copending application Ser. No. 290,733, filed June 26, 1963, I have disclosed a method of manufacturing concrete pressure vessels for nuclear reactors whereby the pressure in the inner space of the vessel, which is assembled of prefabricated components and provided with prestressing members, is brought up to rated pressure and the gaps expanded thereby at the abutting joints between the components are filled with pressure-resistant material. Spindle-shaped and cylindrical embodiments of prestressed concrete pressure vessels manufactured by this method are also described in my aforementioned copending application. The particular advantage of such structural forms is that in both load conditions of these structures, i.e. in the pressure-less condition of the inner space and in the condition wherein the inner space is subjected to pressure, bending moments in the concrete structure are avoided. This is also achieved especially due to the fact that both closure bodies of the inner space, the so-called end blocks, are slidable at the outer walls due to their conical shape, during change in pressure.

It is an object of the invention in this application to provide a prestressed concrete pressure vessel for nuclear reactors which is improved over the vessel described in my aforementioned copending application.

With the foregoing and other objects in view, I provide in accordance with my invention a prestressed concrete pressure vessel for nuclear reactors and the like which comprises a cylindrical wall open at both ends. The cylindrical wall is formed by an assembly of prefabricated concrete segments spaced circumferentially one from the other so as to define a plurality of gaps therebetween which are filled with pressure-resistant material. Annular prestressing means are also provided, and the cylindrical wall has a cylindrical outer surface on which the annular prestressing means are disposed. The cylindrical wall also has a cylindrical inner surface located intermediate to respective regions adjacent the open ends of the cylindrical wall. Radially inwardly extending support members are located at the regions adjacent the open ends and are provided with supporting surfaces, and end blocks inserted in the open ends of the cylindrical wall are provided with conical surfaces engageable with the supporting surfaces of the support members for closing the open ends of the cylindrical wall.

Other features which are considered as characteristic for the invention are set forth in the appended claims.

Although the invention is illustrated and described herein as embodied in prestressed concrete pressure vessels for nuclear reactors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
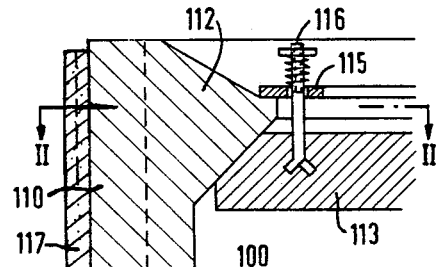
FIG. 1 is an enlarged fragmentary view in vertical cross section of an embodiment of the invention shown in FIG. 5.

In the interest of simplifying the drawing and the disclosure, prestressing members of the first type, described in my aforementioned copending application as comprising tie rods or bracing wires located within the completed concrete components and extending in the axial direction thereof, are not shown in the drawing. The prestressing members of the second type also described in my copending application as comprising annular cables mounted on the outside of the cylindrical outer wall of the vessel, are represented diagrammatically in the drawings of the instant application solely in the form of a lining or covering 117. The pressure vessel 100 consequently consists of the prefabricated form components 110 which are stressed with respect to one another by the prestressing members of the first type (not shown) in the axial direction thereof and by the annular anchoring cables 117 acting as prestressing members of the second type. The prestressing force is produced by applying an inner pressure in accordance with the method described in the aforementioned copending application, as by inflating an elastic bag in the inner space of the vessel, which presses the wall components outwardly so that narrow gaps 111 are formed between the individual prefabricated components and are then filled with concrete that is tamped or pressed into the gaps 111 before the inner pressure is removed. In this way the prestressing of the prestressing members of the second type i.e. the annular anchoring cables 117, is preserved.

In the embodiments of this invention, the inner wall of the reactor pressure vessel is of cylindrical construction. As holding devices for the end blocks 113, support members 112, 122 are arranged at both open ends of the prestressed concrete cylinder which are in flush engagement with the conical surfaces of the end blocks 113. According to FIGS. 1 and 2, these support members 112 are firmly connected with the prefabricated form members 110 and are preferably integrally joined to the latter during the pouring operation of the concrete. To prevent undue stresses during the load deviations, radial slots are left, however, in the inner region which is filled, for example, with foamed polyethylene 114 such as is, for example, known by the trade name "Styropor" or any other suitable elastic and radiation-resistant material before the concrete is poured. The end blocks 113 themselves can be broken through so as to be able to insert supply and discharge pipes, control rod drive mechanisms and the like which are not shown in the drawing.

Figure 3:
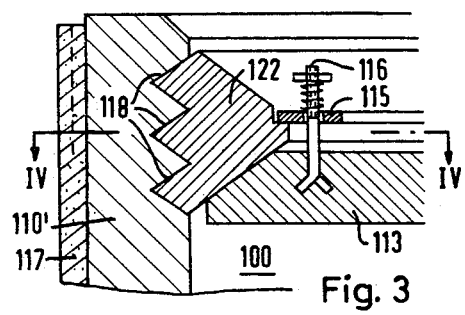
FIG. 3 is an enlarged fragmentary vertical cross section of a modification of FIG. 1.
Figure 2:
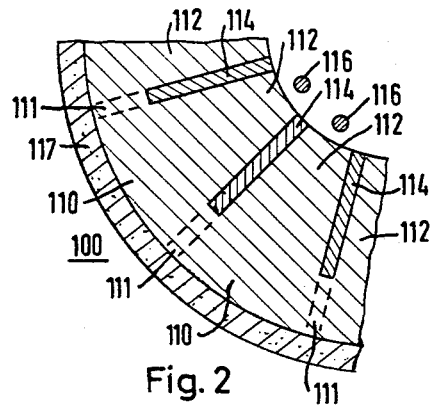
FIG. 2 is a horizontal section of FIG. 1 taken along the line II—II in the direction of the arrows.
Figure 4:
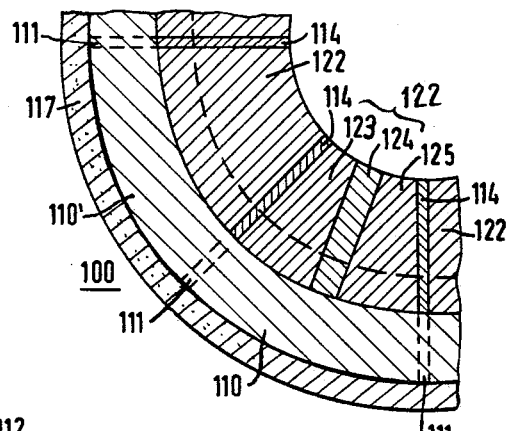
FIG. 4 is a horizontal cross section of FIG. 3 taken along the line IV—IV in the direction of the arrows.

The embodiment in FIGS. 3 and 4 is a reactor pressure vessel similar to the vessel of FIGS. 1 and 2 having end blocks 113, however, which can also be dismantled after completion of the vessel and after applying prestressing thereto, so that the inner space of the pressure vessel is, for example more readily accessible for effecting repairs, For this purpose, the support members 112 are not joined to the form members during the concrete pouring operation for forming the prefabricated form members 110'. The prefabricated members 110' are provided rather with bracing surfaces 118 in the vicinity of the upper and lower rims of the vessel and suitably formed support members 122 are in gripping engagement with these bracing surfaces 118. These support members 122 for their part are provided with support surfaces for flush engagement with the conical surfaces of the ends blocks 113. The support members 122 are of such dimension that the gaps 114 are left therebetween. In order that these wedge-shaped support members 122 may be set in place so as to form a ring-shaped arrangement, it is preferable under certain conditions to subdivide at least one of these wedge-shaped members 122, as seen for example in FIG. 4. FIG. 4 shows a support member 122' of this type which consists of three parts 123, 124 and 125, the middle part 124 thereof having two parallel side surfaces so that it can be withdrawn from the aggregate support member 122' without difficulty. It is consequently then possible to move both side portions 123 and 125 together and thereby to remove the entire support member 122'. In reversed sequence, the part 124 then forms the keystone which holds the entire ring of wedge shaped support members in engagement with the cylindrical wall 110'. The suspension of the end blocks 113 takes place as in the preceding embodiment by means of bolts 116 around which the concrete is poured and a support ring 115 which is supported on suitable recesses or shoulders formed in the support members 122. This support ring 115 has a further purpose in this case of clamping the support members 122 outwardly against the gripping surfaces 118 like a lock ring or washer, in their normal working position.

Figure 5:
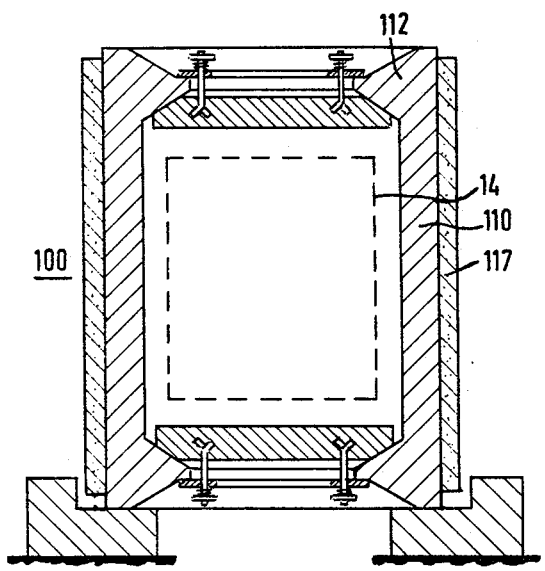
FIG. 5 is a vertical cross section of a pressure vessel constructed in accordance with my invention.

A reactor pressure vessel constructed in accordance with the aforedescribed principles is shown in longitudinal section diagrammatically in FIG. 5. The simplified construction thereof not only makes possible special manufacturing or production facilities, but also simplifies calculation of the forces acting upon the cylindrical pressure members during the various load conditions. It is thus, for example, possible through selecting the slope of the cone surface of the end blocks 113 and the slope of the corresponding opposing surfaces of the support members 112, 122, to make the radial forces transmitted to the end regions of the cylindrical structures as large as in the inner space proper of the vessel and thereby make possible a uniform reinforcement over the entire length of the cylindrical structure. On the other hand, these forces can also naturally be partly transmitted into the vertical components so that at these outer rim zones of the cylindrical structure a lesser reinforcement suffices as is indicated by the broken lines within the layer 117 (FIGS. 1 and 3). It is obviously also possible to replace with a differently shaped interlocking means, the step-shaped wedge between the cylindrical outer wall 110 and the support members 122 that is shown in FIGS. 3 and 4, wherein the step surfaces extend partly parallel to the conical surface of the end blocks 113. Similarly it is also naturally conceivable that the support members 112 should not be joined by concrete pouring with the completed portions 110 according to FIGS. 1 and 2, but rather should be rigidly connected subsequently with the completed portions 110, for example by means of bolts. The tension of the tension members of the second type i.e. the annular cables, can be adjusted in the end regions of the vessel, in the case where the radial pressure is smaller than in the central zones, by suitable selection of the thickness of the cable covering or of the tension cable cross section. In this manner, bending moments due to variations in the load conditions can be avoided safely in the entire reactor pressure vessel.

I claim:

1. Prestressed concrete pressure vessel for nuclear reactors and the like comprising a cylindrical wall open at both ends thereof, said cylindrical wall being formed by an assembly of prefabricated concrete segments spaced circumferentially one from the other so as to define a plurality of gaps therebetween, said gaps being filled with pressure-resistant material, annual prestressing means for prestressing said concrete segments, said cylindrical wall having a cylindrical outer surface on which said annular prestressing means are disposed and a cylindrical inner surface located intermediate to respective regions adjacent the open ends of said cylindrical wall, said prefabricated concrete segments at said regions being formed with bracing surfaces, wedge-shaped support members having surfaces engageable with said bracing surfaces and extending radially inwardly of said cylindrical wall, said support members also being formed with bearing contact surfaces, and end blocks inserted in said open ends and having conical surfaces engageable with said bearing contact surfaces for closing the open ends of said cylindrical wall, said bracing surfaces being in substantially stepwise arrangement and being at least partly parallel to the conical surfaces of said end blocks.

2. Prestressed concrete pressure vessel for nuclear reactors and the like comprising a cylindrical wall open at both ends thereof, said cylindrical wall being formed by an assembly of prefabricated concrete segments spaced circumferentially one from the other so as to define a plurality of gaps therebetween, said gaps being filled with pressure-resistant material, annular prestressing means for prestressing said concrete segments, said cylindrical wall having a cylindrical outer surface on which said annular prestressing means are disposed and a cylindrical inner surface located intermediate to respective regions adjacent the open ends of said cylindrical wall, said prefabricated concrete segments at said regions being formed with bracing surfaces, wedge-shaped support members having surfaces engageable with said bracing surfaces and extending radially inwardly of said cylindrical wall, said support members also being formed with bearing contact surfaces, and end blocks inserted in said open ends and having conical surfaces engageable with said bearing contact surfaces for closing the open ends of said cylindrical wall, at least one of said wedge-shaped support members consisting of two side portions and a middle portion, said middle portion lying substantially in a plane passing through the longitudinal axis of the cylindrical wall and having parallel side surfaces respectively adjacent said side portions.

References Cited

UNITED STATES PATENTS

| Re. 23,805 | 3/1954 | Laurent | 220—25 |
| 2,683,914 | 7/1954 | Reimbert | 264—228 |
| 3,237,358 | 3/1966 | Harris | 52—224 |

FOREIGN PATENTS

| 223,816 | 7/1910 | Germany. |

FRANK L. ABBOTT, *Primary Examiner.*

ALFRED C. PERHAM, *Examiner.*